Jan. 30, 1940.  A. A. BOUVIER ET AL  2,188,648
CASTER
Filed April 21, 1938  2 Sheets-Sheet 1
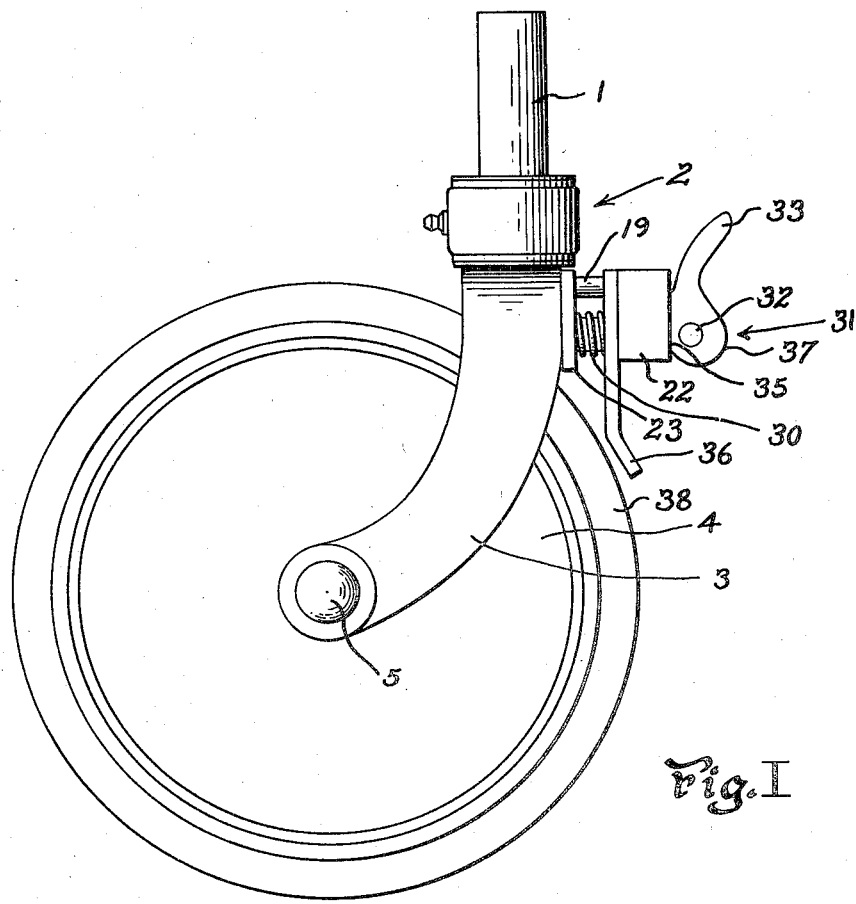
Fig. I
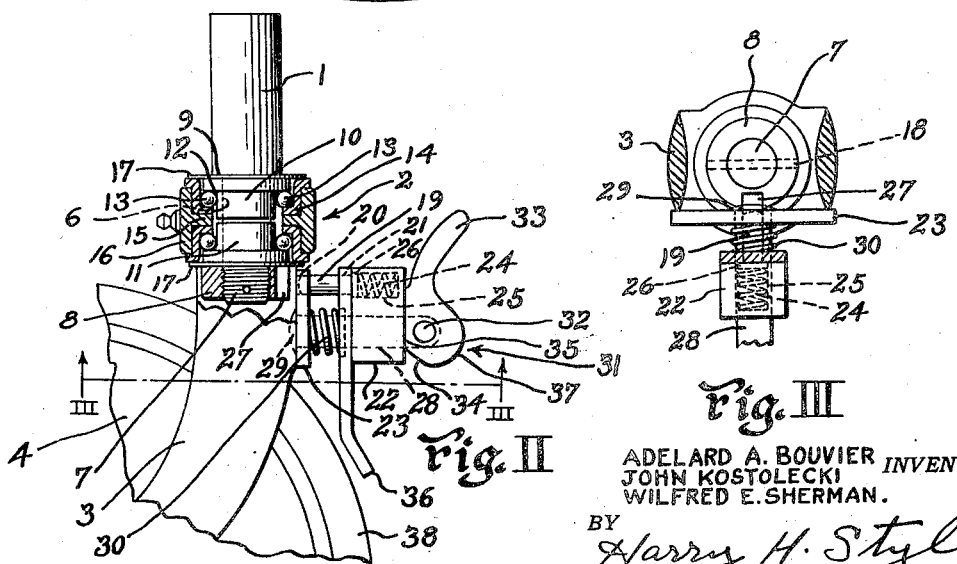
Fig. II
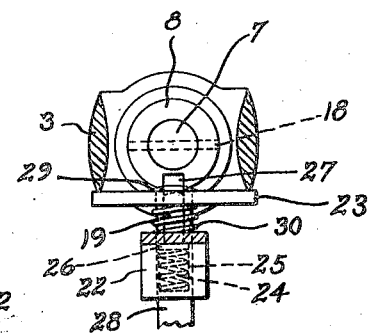
Fig. III
ADELARD A. BOUVIER
JOHN KOSTOLECKI  INVENTORS
WILFRED E. SHERMAN.
BY Harry H. Styll
ATTORNEY.

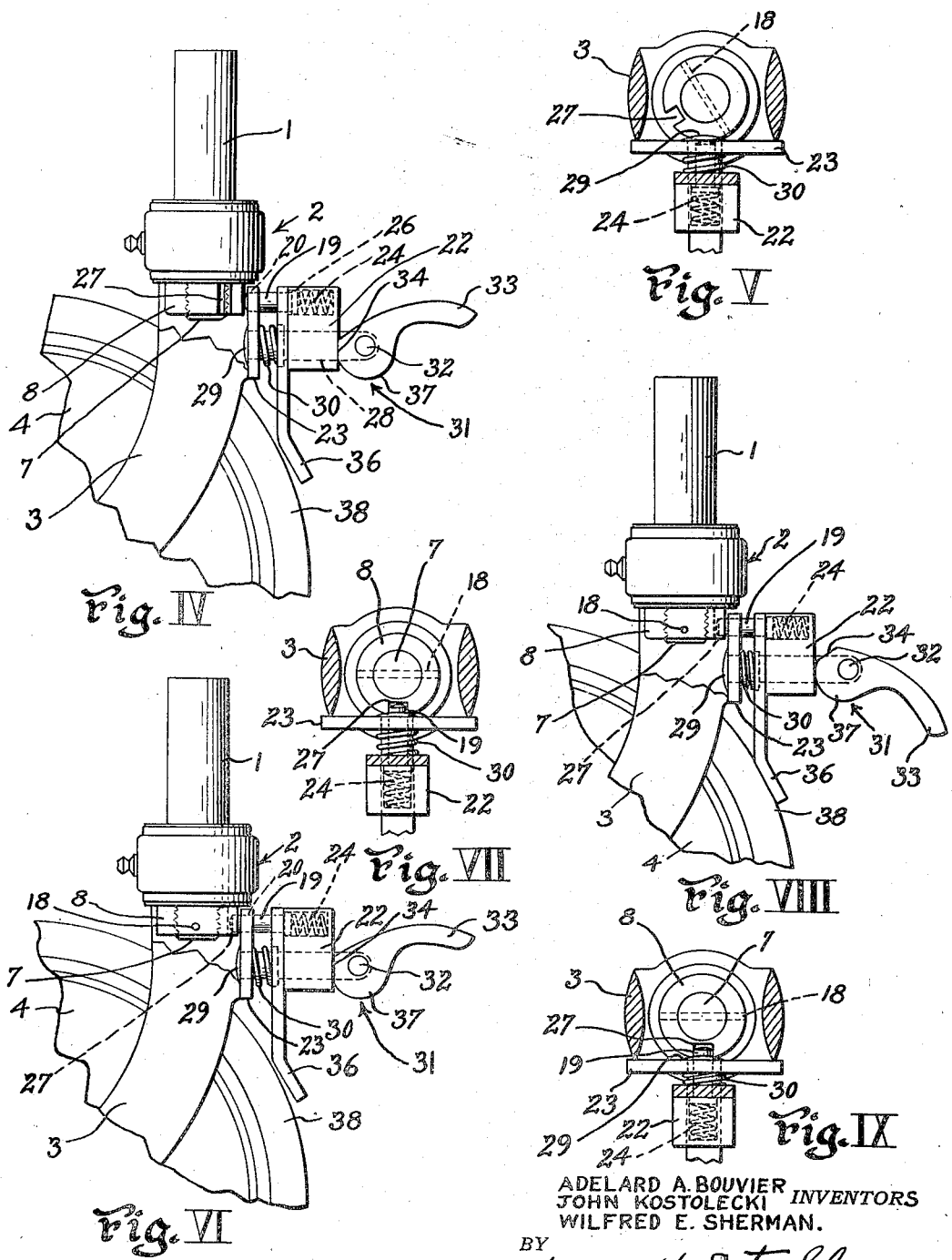

Patented Jan. 30, 1940

2,188,648

UNITED STATES PATENT OFFICE 2,188,648

CASTER

Adelard A. Bouvier, John Kostolecki and Wilfred E. Sherman, Palmer, Mass., assignors to Jarvis & Jarvis, Inc., Palmer, Mass., a corporation of Massachusetts Application April 21, 1938, Serial No. 203,408

3 Claims. (Cl. 16—35)

This invention relates to improvements in casters and has particular reference to a combined caster swivel and wheel brake construction, and method of making the same.

One of the principal objects of the invention is to provide a swivel type caster with a novel braking device which in one braking position locks the swivel against movement and in another braking position provides a combined lock for the swivel and the caster wheel and has particular reference to a novel method of making the same.

Another object of the invention is to provide a swivel type caster with simple and efficient depressible means for locking the said caster against said swivel movement and for bringing about combined swivel and wheel braking action at different depressed positions of said depressible means and to provide simple and positive functioning release means for unlocking said swivel and wheel brake means.

Another object is to provide a swivel braking device which may be adjusted to a position whereby its operating mechanism will function automatically to lock the swivel when the parts of the braking mechanism are moved into desired aligned relation with each other.

Other objects and advantages of the invention will become apparent from the following description taken in connection with the accompanying drawings and it will be apparent that many changes may be made in the details of construction, arrangement of parts and method shown and described without departing from the spirit of the invention as expressed in the accompanying claims. We, therefore, do not wish to be limited to the exact details, arrangements, and method shown and described as the preferred form only has been given by way of illustration.

Referring to the drawings:

Fig. I is a side elevation of a caster embodying the invention;

Fig. II is a fragmentary side elevation of the device embodying the invention showing the braking parts in unlocked position and showing a portion thereof in section;

Fig. III is a fragmentary sectional view taken as on line III—III of Fig. II and looking in the direction of the arrows;

Fig. IV is a view generally similar to Fig. II showing the swivel locking device in position to perform its locking function;

Fig. V is a view similar to Fig. III showing the swivel locking device in the position stated in Fig. IV;

Fig. VI is a view generally similar to Fig. IV showing the swivel locking device in locked position;

Fig. VII is a view generally similar to Fig. V showing the swivel locking device in locked position as shown in Fig. VI;

Fig. VIII is a view generally similar to Fig. VI showing the swivel locking or braking device and wheel locking or braking device in locked or braking position; and Fig. IX is a view similar to Fig. VII showing the relation of parts when both of the locking devices are in locked position as shown in Fig. VIII.

Many devices requiring the use of casters; such as hospital equipment including beds, conveyors, stretchers and so forth, may be more easily handled or moved in all directions if the said casters have a swivel action. Although such a swivel action is desirable when the said devices are being moved it is also particularly desirable, in some instances, to have the said devices remain set and immovable after they have been moved to a desired destination.

It, therefore, is one of the principal objects of the invention to provide swivel type caster means with a free functioning swivel action as well as free rotary action of the caster wheels in combination with means for locking the said swivel and wheels against movement when desired.

Referring more particularly to the drawings wherein like characters of reference designate like parts throughout the several views the caster embodying the invention comprises broadly a caster stem 1 having a swivel connection 2 to a bifurcated support 3 to which the roller or caster wheel 4 is pivotally attached as designated at 5. The swivel connection 2 constitutes a reduced extension 6 on the stem 1 which extends through an attaching opening in the base of the bifurcated support 3. The reduced extension has a threaded end 7 on which a suitable attaching nut 8 is threaded to attach the said bifurcated support to the stem 1.

Between the nut 8 and a shoulder 9 on the stem 1 there is provided roller bearings formed of two spaced cone-like sleeves 10 and 11 which are fitted on the reduced extension 6 as illustrated in Fig. II. Each of said cone-like sleeves 10 and 11 are preferably formed of hardened steel and are each provided with a ball race 12 which supports a plurality of steel balls or the like 13. The balls 13 are held in position on the ball races 12 by means of cup-like members 14 preferably formed of hardened steel. The cup-like members 14 are supported in spaced relation with each other by means of an inner flange 15 formed on a suitable sleeve-like housing 16 which surrounds the said cup-like members. To aid in preventing the entrance of dirt, dust and so forth, in the bearing the opposite ends thereof are provided with overlapping lips 17.

The bearing set forth above is adapted to take up both end and side thrust and will permit free swivel action of the bifurcated support 3 relative to the stem 1.

The nut 8 is preferably secured to the threaded end of the reduced extension 7 by means of a key pin 18. This positively locks the connected parts against loosening during use.

The braking or locking means for securing the bifurcated support 3 against swivel movement relative to the stem 1 comprises a plunger 19 mounted to slide within the aligned openings 20 and 21 of a slide block 22 and plate 23 secured to the bifurcated support 3. The plate 23 may be formed integral with the bifurcated support 3 if desired.

The plunger 19 is resiliently urged toward the nut 8 by a coil spring or the like 24 mounted within an opening 25 in the slide block 22.

The plunger 19 is provided with an enlarged head 26 which is adapted to hold the said plunger 19 against rejection from the opening 25 in the block 22. The said plunger is urged by the resilient means 24 toward the nut 8 as stated above and is adapted, when in interlocked relation with said nut, to be extended, as shown in Fig. VII, within a slot 27 in said nut. The remainder of the contour of the nut 8 is provided with a relatively smooth circular contour which, when the said plunger 19 is moved toward said nut and is not in aligned relation with the slot 27, will permit free rotary movement of the said nut 8 relative to the said plunger as shown in Fig. V. It is apparent that when in this position, if the slot 27 in the nut 8 is moved into alignment with the plunger 19, the said plunger will be moved, under the action of the resilient means 24, into the said slot 27 and will be interlocked therewith. This is clearly shown in Figs. VI and VII.

The block 22, in which the plunger 19 is slidably supported, is slidably mounted on a rod-like member 28 secured adjacent its inner end 29 to the plate 23. The block 22 is normally urged in a direction away from the plate 23 by means of a coil spring or the like 30. The outer end of the rod-like member 28 has a cam member 31 pivoted thereto as illustrated at 32. The said cam member is provided with an integral lever 33 which is adapted to rotate the said cam member 31 and, due to the contour shape of said cam member, urge the said block 22 toward the plate 23 against the resilient action of the resilient means 30. The movement brought about by the cam member 31 is in selected steps, the first of which, moves the face 34 of the said cam member into contact with the rear surface 35 of the slide block 22 as illustrated in Fig. VI. The extent of this movement is such as to cause the plunger 19 to move sufficiently inwardly of the opening 20 in the plate 23 as to allow it to extend within the slot 27 in the nut 8.

The block 22 is provided with a brake shoe 36 which, in the above position of movement, is moved toward the wheel 4 but is not moved into engagement therewith.

The above described movement merely moves the swivel locking means into braking position. To bring about the combined swivel locking and wheel braking action the cam member 31, through further depression of the lever 33, as illustrated in Fig. VIII, is rotated until its high spot 37 is moved into engagement with the rear or adjacent edge 35 of the slide block 22. This moves the brake shoe 36 into engagement with the wheel 4. The wheel 4 is preferably provided with a soft tire of rubber or the like 38 which provides a more positive braking action when the brake shoe 36 is moved into engagement therewith.

When in the above position both the swivel and wheel are locked against movement. This is clearly shown in Fig. VIII.

When it is desired to release both braking actions the lever 33 is merely snapped upwardly to a position illustrated in Figs. I and II.

The operation of the braking device is substantially as follows:

When it is desired to merely lock the wheel support against swivel movement the lever 33 is depressed an amount sufficient to move the surface 34 of the cam into engagement with the surface 35 of the slide block 22. The said surfaces 34 and 35 being relatively flat will tend to maintain this adjusted relation. This adjustment causes the slide block 22 to move toward the plate 23 and simultaneously causes the plunger 19 to be urged toward the nut 8 by the resilient means 24. Should the slot 27 be out of alignment with the plunger 19 the said plunger will be held against the action of the resilient means 24 by the circular side contour of the nut 8, as shown in Fig. V. The swivel locking action will, therefore, take place automatically when the slot 27 is rotated into alignment with the plunger 19 wherein the resilient means will force the plunger 19 inwardly of said slot.

To bring about the braking action of the wheel 4 the said lever 33 is further depressed until the high spot 37 of the cam forces the block 22 further toward the plate 23 and thereby moves the said brake shoe 36 into engagement with the tire 38 of the wheel. The resilient means 24 and the length of the opening 26 is such as to permit this further movement of the block 22 toward the plate 24 and in no way hinders the function of the swivel locking device. When it is desired to release the braking and swivel locking means the lever 33 is merely lifted upwardly wherein the spring 30 will move the block 22 outwardly and simultaneously move the plunger 19 outwardly of the slot 27 and the brake shoe 36 clear of the tire 38 of the wheel 4.

From the foregoing description it will be seen that simple, efficient and economical means and method have been provided for accomplishing all of the objects and advantages of the invention.

Having described our invention, we claim:

1. In a device of the character described the combination of a stem-like member and a castor supporting member having a swivel connection therewith, a castor wheel pivoted to said supporting member, one of said members having engageable means thereon and the other binding means movable into engagement with said engageable means and having brake means thereon for engaging the castor wheel and means adjustable to one position for engaging said binding means with said engageable means without moving the brake means into engagement with the wheel and adjustable to another position for forcing the said brake means into braking engagement with the wheel without disassociating said engageable and binding means.

2. In a device of the character described, the combination of a stem member and a castor supporting member having a swivel connection with each other, a castor wheel rotatably supported by said supporting member, one of said members having interlocking means thereon and the other having a slide projection, a slide on said slide projection having a wheel braking shoe and spring pressed slidably mounted means thereon and means associated with said slide projection adjustable to one position for urging said slide towards the castor supporting member to move said slide together with the spring pressed means and wheel braking shoe towards said portion having the interlocking means thereon to locate said spring pressed means in a position wherein it will interlock with the interlocking means and hold said members against swivel movement relative to each other and yet support the shoe in spaced relation with the wheel and being adjustable to another position whereby it will force the shoe into braking relation with the wheel without disassociating the spring pressed means with said interlocking means.

3. In a device of the character described, the combination of a stem-like member and a castor supporting member having a swivel connection therewith, a castor wheel pivoted to said supporting member, one of said members having a slotted portion and the other a slide projection thereon, a slide on said slide projection having a part shaped to overlie the edge surface of the castor wheel and having a spring pressed plunger slidably mounted thereon, and means adjustable to a given position for urging said slide towards the castor support and simultaneously move said spring pressed plunger towards the slotted portion an amount sufficient to engage the plunger with said slotted portion to lock said members against swivel movement relative to each other with the part shaped to overlie the edge surface of the castor wheel spaced from said edge surface and being further adjustable an amount sufficient to urge said part into engagement with the edge surface of the castor wheel without disassociating the spring pressed plunger and slotted portion whereby both the wheel and swivel connection will be locked.

ADELARD A. BOUVIER.
JOHN KOSTOLECKI.
WILFRED E. SHERMAN.